United States Patent
Yoon et al.

(10) Patent No.: US 10,818,970 B2
(45) Date of Patent: Oct. 27, 2020

(54) ALL-SOLID BATTERY

(71) Applicants: Hyundai Motor Company, Seoul (KR); Kia Motors Corporation, Seoul (KR)

(72) Inventors: Yong Sub Yoon, Seoul (KR); Yun Sung Kim, Seoul (KR); Pil Gun Oh, Seoul (KR); Hong Seok Min, Gyeonggi-do (KR); Oh Min Kwon, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 16/163,174

(22) Filed: Oct. 17, 2018

(65) Prior Publication Data
US 2019/0198916 A1 Jun. 27, 2019

(30) Foreign Application Priority Data
Dec. 27, 2017 (KR) ........................ 10-2017-0181111

(51) Int. Cl.
| | | |
|---|---|---|
| *H01M 6/18* | (2006.01) | |
| *H01M 10/0562* | (2010.01) | |
| *H01M 10/0525* | (2010.01) | |
| *H01M 10/04* | (2006.01) | |
| *H01M 4/58* | (2010.01) | |
| *H01M 4/36* | (2006.01) | |
| *H01M 4/525* | (2010.01) | |
| *H01M 4/38* | (2006.01) | |

(Continued)

(52) U.S. Cl.
CPC ....... *H01M 10/0562* (2013.01); *H01M 4/366* (2013.01); *H01M 4/386* (2013.01); *H01M 4/387* (2013.01); *H01M 4/525* (2013.01); *H01M 4/587* (2013.01); *H01M 4/5825* (2013.01); *H01M 4/62* (2013.01); *H01M 10/0413* (2013.01); *H01M 10/0525* (2013.01); *H01M 2300/0094* (2013.01)

(58) Field of Classification Search
CPC ......... H01M 10/0562; H01M 10/0413; H01M 10/0525; H01M 10/052; H01M 4/366; H01M 4/386; H01M 4/387; H01M 4/525; H01M 4/5825; H01M 4/587; H01M 4/62; H01M 2300/0094
See application file for complete search history.

(56) References Cited

U.S. PATENT DOCUMENTS

| | | | |
|---|---|---|---|
| 9,673,482 B2* | 6/2017 | Kambara | H01M 4/485 |
| 10,008,714 B2* | 6/2018 | Mizutani | H01M 4/364 |
| 2016/0233510 A1* | 8/2016 | Onodera | H01M 10/05 |

FOREIGN PATENT DOCUMENTS

| | | |
|---|---|---|
| JP | 2009-094029 A | 4/2009 |
| JP | 2015-088480 A | 5/2015 |

(Continued)

*Primary Examiner* — Raymond Alejandro
(74) *Attorney, Agent, or Firm* — Mintz Levin Cohn Ferris Glovsky and Popeo, P.C.; Peter F. Corless (57) ABSTRACT

Disclosed is an all-solid battery, including a cathode, an anode, and a solid electrolyte layer. The solid electrolyte layer may include a first solid electrolyte having an ionic conductivity ranging from greater than about $5 \times 10^{-3}$ S/cm to about $1 \times 10^{-1}$ S/cm and a second solid electrolyte having an ionic conductivity ranging from greater than about $5 \times 10^{-4}$ S/cm to about $1 \times 10^{-2}$ S/cm.

12 Claims, 3 Drawing Sheets

(51) Int. Cl.
 *H01M 4/587* (2010.01)
 *H01M 4/62* (2006.01)

(56) References Cited

FOREIGN PATENT DOCUMENTS

| KR | 2011-0055635 A | 5/2011 |
| KR | 10-1359900 B1 | 2/2014 |
| KR | 10-1367787 B1 | 2/2014 |
| KR | 10-1592698 B1 | 2/2016 |
| KR | 10-1655627 B1 | 9/2016 |

\* cited by examiner

Cathode layer

Electrolyte layer

FIG.3B

Cathode layer

Electrolyte layer

ALL-SOLID BATTERY

CROSS-REFERENCE TO RELATED APPLICATION

This application claims under 35 U.S.C. § 119(a) the benefit of priority to Korean Patent Application No. 10-2017-0181111 filed on Dec. 27, 2017, the entire contents of which are incorporated herein by reference.

TECHNICAL FIELD

The present invention relates to an all-solid battery. The all-solid battery may have increased power output and deformation of a solid electrolyte layer in the all-solid battery may be reduced.

BACKGROUND OF THE INVENTION

Although lithium secondary batteries have been mainly applied in fields of small-sized devices such as mobile devices or laptop computers, research thereto is recently expanding to include fields of medium- to large-sized devices, particularly in fields requiring high power output, such as energy storage systems (ESS), electric vehicles (EV), and the like.

In the case of such medium- to large-sized lithium secondary batteries, operating conditions (e.g. temperature, impact, and the like) may be severe, unlike small-sized batteries, but also factors, such as energy density, power output, ease of estimation of state of charge (SOC)/state of health (SOH), and the like should be adequately met for medium- to large-sized batteries.

A lithium ion battery using an existing liquid electrolyte typically includes an electrolytic solution containing a flammable organic solvent, which may lead to serious safety problems in the event in which cells are uncontrollably exposed to a variety of environments and external impacts.

In order to overcome the limitations of various material characteristics of conventional lithium ion batteries using such liquid electrolytes, an all-solid battery using a solid electrolyte may be applied. However, the solid electrolyte, which is the key material of the all-solid battery, mainly includes a sulfide-based compound, which is highly reactive with atmospheric moisture, making it difficult to handle in an ambient atmosphere, as in conventional processes.

SUMMARY OF THE INVENTION

In preferred aspects, the present invention is intended to provide an all-solid battery, which may exhibit increased power output and reduced deformation of a solid electrolyte layer.

The term "all-solid cell" or "all-solid battery" as described herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component.

In one aspect, the present invention provides an all-solid battery that may include a cathode, an anode, and a solid electrolyte layer disposed between the cathode and the anode. Preferably, the solid electrolyte layer may include a first solid electrolyte having an ionic conductivity ranging from greater than about $5 \times 10^{-3}$ S/cm to $1 \times 10^{-1}$ S/cm and a second solid electrolyte having an ionic conductivity ranging from greater than about $5 \times 10^{-4}$ S/cm to $1 \times 10^{-2}$ S/cm.

The first solid electrolyte may be a crystalline sulfide solid electrolyte. The first solid electrolyte may suitably include at least one selected from the group consisting of Li—Ge—P—S, Li—Si—P—S—Cl, Li—P—S—Cl, Li—P—S—Br and Li—P—S—Br—Cl.

The term "crystalline sulfide" as used herein refers to a compound containing sulfur that may exhibit high symmetry in its crystal form, as being combined with a metal (e.g., Li, Fe, Cu, Ni, Co, Ag, Mg, Zn, Na, Ge, and the like) and/or a non-metal (e.g., P, halogen, Si, and the like), via covalent bond or ionic bond. In certain preferred aspect, the crystalline sulfide may include at least Li, such that the crystalline sulfide may have substantial ionic conductivity as a solid state, e.g., greater than about $1 \times 10^{-3}$ S/cm, or particularly about $5 \times 10^{-3}$ S/cm. For example, the crystalline sulfide may be a solid electrolyte in an all-solid battery.

The second solid electrolyte may be an amorphous sulfide solid electrolyte. The amorphous sulfide solid electrolyte may suitably include at least one selected from the group consisting of LiI-Li$_2$S—P$_2$S$_5$, LiI—Li$_2$S—B$_2$S$_3$, Li$_3$PO$_4$—Li$_2$S—Si$_2$S, Li$_3$PO$_4$—Li$_2$S—SiS$_2$, LiPO$_4$—Li$_2$S—SiS, LiI—Li$_2$S—P$_2$O$_5$, LiI—Li$_3$PO$_4$—P$_2$S$_5$, Li$_3$PS$_4$, and Li$_2$S—P$_2$S$_5$.

The term "amorphous sulfide" as used herein refers to a compound containing sulfur that does not have crystal form or defined symmetry, as being combined with a metal (e.g., Li, Fe, Cu, Ni, Co, Ag, Mg, Zn, Na, Ge, and the like) and/or a non-metal (e.g., P, halogen, Si, and the like) via covalent bond or ionic bond. In certain preferred aspect, the amorphous sulfide may include at least Li, but due to lack of crystallinity, the sulfide may have ionic conductivity of about $1 \times 10^{-2}$ S/cm or less.

A particle size of the second solid electrolyte may be less than a particle size of the first solid electrolyte.

The size of each particle may be measured at a maximum cross-sectional dimension. In addition, the size of the particle (e.g., first or second solid electrolyte particles) may be an average or a mean value of the sizes of the particles. In certain preferred aspects, the particle size may be measured based on D50, which is a median value in the cumulative distribution upon particle size analysis of a powder or powdered particle, and typically refers to a particle size corresponding to 50% of the total particles.

The first solid electrolyte may have the particle size of about 5 to 20 μm.

The second solid electrolyte may have the particle size of about 0.5 to 4 μm.

The weight ratio of the first solid electrolyte to the second solid electrolyte may be in the range of about 50:50 to 90:10.

The cathode may include the first solid electrolyte, the second solid electrolyte and a cathode active material.

The cathode active material may suitably include at least one selected from the group consisting of lithium cobalt oxide, lithium iron phosphate, nickel cobalt aluminum, and nickel cobalt manganese.

The anode may include the first solid electrolyte, the second solid electrolyte, and an anode active material.

The anode active material may suitably include at least one selected from the group consisting of graphitizable carbon (soft carbon), non-graphitizable carbon (hard carbon), natural graphite, artificial graphite, silicon (Si) and tin (Sn).

The term "graphitizable carbon" or "soft carbon" as used herein refers to a carbon material that can be transformed into high crystallinity after high temperature treatment (e.g., 3000° C.) such as graphitic carbon or portion of the carbon present as graphite. The term "non-graphitizable carbon" or "hard carbon" as used herein refers to a carbon material that cannot be transformed into graphitic carbon or crystallinity solely by high-temperature treatment (e.g., 3000° C.) such as graphitic carbon or portion of the carbon present as graphite.

The first solid electrolyte 21 may have the ionic conductivity different from the ionic conductivity of the second solid electrolyte 22, for example, by 10% or greater, by about 20% or greater, by about 30% or greater, by about 40% or greater, by about 50% or greater, by about 60% or greater, by about 70% or greater, by about 80% or greater, by about 90% or greater, by about 95% or greater, or by about 100% or greater of the ionic conductivity of the second solid electrolyte 22.

In addition, the first solid electrolyte 21 may have the ionic conductivity greater than the ionic conductivity of the second solid electrolyte 22, for example, by 1.5 fold or greater, by about 2 fold or greater, by about 3 fold or greater, by about 4 fold or greater, by about 5 fold or greater, by about 10 fold or greater, by about 20 fold or greater, by about 30 fold or greater, by about 50 fold or greater, by about 100 fold or greater, by about 150 fold or greater, or by about 200 fold or greater of the ionic conductivity of the second solid electrolyte 22.

Further provided is a vehicle that may include the all-solid battery as described herein.

According to various exemplary embodiments of the present invention, an all-solid battery may include a solid electrolyte layer including a first solid electrolyte and a second solid electrolyte having different ionic conductivities. For instance, the first solid electrolyte and the second solid electrolyte may be mixed so that the surface of the first solid electrolyte may be covered with the second solid electrolyte, thus ensuring a main ion transfer path through the first solid electrolyte and minimizing the incidence of pores by filling the space between particles of the first solid electrolyte with the second solid electrolyte.

According to the various exemplary embodiments of the present invention, energy density can be improved through an increase in the density of the electrode mixture, and lithium dendrite growth can be suppressed.

Further, the contact between electrolyte particles can be improved, thus facilitating interfacial ion migration and reducing the deformation of the solid electrolyte layer, and the internal resistance of the all-solid battery can be decreased and high power output thereof becomes possible.

DETAILED DESCRIPTION

The above and other aspects, features and advantages of the present invention will be more clearly understood from the following preferred embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a first element discussed below could be termed a second element without departing from the scope of the present invention. Similarly, the second element could also be termed a first element. As used herein, the singular forms are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

The terminology used herein is for the purpose of describing particular embodiments only and is not intended to be limiting. As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
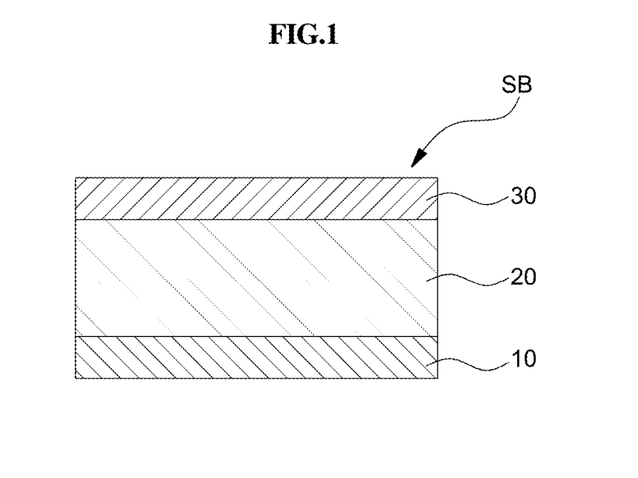
FIG. 1 is a cross-sectional view schematically showing an exemplary all-solid battery according to an exemplary embodiment of the present invention.

FIG. 1 is a cross-sectional view schematically showing an exemplary all-solid battery according to an exemplary embodiment of the present invention.

With reference to FIG. 1, the all-solid battery (SB) according to an exemplary embodiment of the present invention includes a cathode 10, a solid electrolyte layer 20, and an anode 30. The cathode 10 may include a first solid electrolyte 21, a second solid electrolyte 22, and a cathode active material. The first solid electrolyte 21 and the second solid electrolyte 22 are described in detail later. The cathode active material may suitably include at least one selected from the group consisting of, for example, lithium cobalt oxide, lithium iron phosphate, nickel cobalt aluminum, and nickel cobalt manganese.

The anode 30 may be disposed to face the cathode 10. The anode 30 may include a first solid electrolyte 21, a second solid electrolyte 22, and an anode active material. The first solid electrolyte 21 and the second solid electrolyte 22 are described in detail later. The anode active material may suitably include at least one selected from the group consisting of, for example, graphitizable carbon (soft carbon), non-graphitizable carbon (hard carbon), natural graphite, artificial graphite, silicon (Si) and tin (Sn).

Each of the anode 30 and the cathode 10 may further include a conductive additive and a binder. The conductive additive may include conductive carbon such as Super C65 made by Timcal, Super P in powder form, or conductive carbon in rod form provided by Denka or VGCF. The binder as used herein may be used to improve solvent solubility and reactivity with the first and second solid electrolytes. Preferably, the binder may suitably include at least one polymer compound selected from the group consisting of butyl rubber-, fluorine-, diene-, acryl- and silicone-based compounds. For example, the binder may include acrylonitrile-butadiene rubber (NBR).

Each of the anode 30 and the cathode 10 may include an organic solvent for the preparation of an electrode slurry, and the organic solvent may suitably include cyclic aliphatic hydrocarbons, such as cyclopentane, cyclohexane or mixtures thereof, and aromatic hydrocarbons, such as toluene, xylene or mixtures thereof, in which the aliphatic hydrocarbons and the aromatic hydrocarbons may be used alone or in combinations of two or more thereof. The organic solvent may suitably be selected depending on the desired drying rate or environmental conditions.

Figure 2:
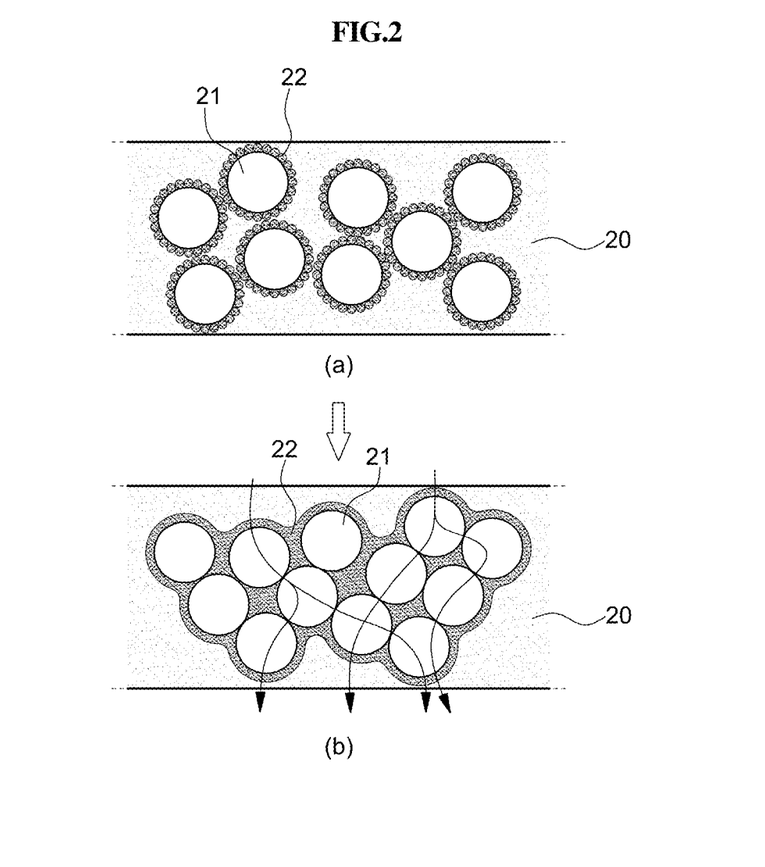
FIG. 2 schematically shows an exemplary solid electrolyte layer of an exemplary all-solid battery according to an exemplary embodiment of the present invention.

FIG. 2 schematically shows an exemplary solid electrolyte layer of an exemplary all-solid battery according to an exemplary embodiment of the present invention. The solid electrolyte layer 20 of FIG. 2 may be provided between the cathode 10 and the anode 30. The solid electrolyte layer 20 may suitably include the first solid electrolyte 21 and the second solid electrolyte 22.

The particle size of the second solid electrolyte 22 may be less than the particle size of the first solid electrolyte 21. The first solid electrolyte 21 and the second solid electrolyte 22 may be provided in the form of a core-shell structure. For example, the surface of the first solid electrolyte 21, having a large particle size and being hard, may be covered with the second solid electrolyte 22, having a small particle size and being soft.

When the solid electrolyte layer 20 is compressed using an ultrahigh-pressure press, the surface of the first solid electrolyte 21 may be covered with the second solid electrolyte 22 and the space between particles of the first solid electrolyte 21 may be filled to thereby minimize the incidence of pores, and moreover, interfacial ion migration between the particles may be facilitated. Furthermore, the first solid electrolyte 21 having a large particle size may function as a main lithium ion transfer path, and atmospheric stability or moisture stability may be ensured.

Preferably, the first solid electrolyte 21 may have a particle size of about 5 to 20 μm as measured by D50. For example, D50 is a median value in the cumulative distribution upon particle size analysis of a powder or powdered particle, is generally used as a representative of the particle size of a sample, and refers to a particle size corresponding to 50% of the total particles. When the particle size of the first solid electrolyte 21 is less than about 5 μm, nano-sized fine powder may be included, and thus the slurry mixing process may become problematic. On the other hand, when the particle size thereof is greater than about 20 μm, pinholes may be formed in the electrode due to the large size of the particles, thus deteriorating the battery performance.

Furthermore, the first solid electrolyte 21 may have an ionic conductivity ranging from greater than about $5 \times 10^{-3}$ S/cm to $1 \times 10^{-1}$ S/cm. When the ionic conductivity of the first solid electrolyte 21 is about $5 \times 10^{-3}$ S/cm or less, lithium ion conduction between the cathode and the anode in the configuration of the all-solid battery, which is the main path thereof, may not be provided, thereby deteriorating cell performance. Preferably, the higher the ionic conductivity of the first solid electrolyte 21, the better the battery performance, but the ionic conductivity of the first solid electrolyte may suitably be of about $1 \times 10^{-1}$ S/cm or less due to performance limitations based on the characteristics of the solid electrolyte.

Also, the first solid electrolyte 21 may have greater hardness and less atmospheric stability than those of the second solid electrolyte 22. For example, a crystalline sulfide solid electrolyte as the first solid electrolyte 21 may be hard or greater crystallinity because of thermal treatment at relatively high temperatures, but may be brittle and may break down when a predetermined physical force is applied thereto. The first solid electrolyte 21 may suitably include at least one solid electrolyte selected from the group consisting of Li—Ge—P—S, Li—Si—P—S—Cl, Li—P—S—Cl, Li—P—S—Br and Li—P—S—Br—Cl. Preferably, the first solid electrolyte 21 may include at least one selected from the group consisting of $Li_6PS_5Cl$, $Li_6PS_5Br$ and $Li_6PS_5Cl_xBr_{(1-x)}$ ($0.1 \leq x \leq 0.9$).

The second solid electrolyte 22 may have an ionic conductivity ranging from greater than about $5 \times 10^{-4}$ S/cm to $1 \times 10^{-2}$ S/cm. When the ionic conductivity of the second solid electrolyte 22 is about $5 \times 10^{-4}$ S/cm or less, t performance may deteriorate due to the lack of ion conduction characteristics, without improvement in interfacial resistance due to softness. Moreover, the higher the ionic conductivity of the second solid electrolyte 22, the better the battery performance, but the ionic conductivity of the second solid electrolyte may be preferably limited to about $1 \times 10^{-2}$ S/cm or less, taking into consideration that atmospheric stability and ionic conductivity are typically incompatible with each other.

The second solid electrolyte 22 may be an amorphous sulfide solid electrolyte, in which the crystal structure of a raw material breaks through a strong pulverization process and the binding energy between the elements is weakened, thus exhibiting softness upon physical impact. However, it may not form a specific path for lithium element migration, as in the first solid electrolyte 21, and thus the conductive performance may be deteriorated.

The second solid electrolyte 22 may suitably include at least one amorphous sulfide solid electrolyte selected from the group consisting of LiILi$_2$S—P$_2$S$_5$, LiI—Li$_2$S—B$_{2}$S$_{3}$, Li$_3$PO$_4$—Li$_2$S—Si$_2$S, Li$_3$PO$_4$—Li$_2$S—Si$_{S2}$, LiPO$_4$—Li$_2$S—SiS, LiI—Li$_2$S—P$_2$O$_5$, LiI—Li$_3$PO$_4$—P$_2$S$_5$, Li$_3$PS$_4$, and Li$_2$S—P$_2$S$_5$. The second solid electrolyte 22 may provide superior atmospheric stability and control the mechanical properties of the all-solid battery.

The second solid electrolyte 22 may have a particle size of about 0.5 to 4 μm based on D50. When the particle size of the second solid electrolyte 22 is less than about 0.5 μm, the extent of interparticle connection of the first solid electrolyte 21 may decrease, undesirably deteriorating the battery performance. On the other hand, when the particle size thereof is greater than about 4 μm, the migration path of lithium ions may be obstructed, undesirably deteriorating the conductive performance.

The weight ratio of the first solid electrolyte 21 to the second solid electrolyte 22 may be of about 50:50 to 90:10. When the relative weight of the first solid electrolyte 21 is less than about 50%, the extent of interparticle connection of the first solid electrolyte, which is the main migration path of lithium ions, may decrease, and thus the desired battery performance may not be assured. On the other hand, when the relative weight thereof is greater than about 90%, the surface of the first solid electrolyte 21 may not be sufficiently protected and the density of the electrode mixture may increase due to the insufficient amount of the second solid electrolyte 22.

The solid electrolyte layer may include a first solid electrolyte 21 and a second solid electrolyte 22 having different ionic conductivities. The first solid electrolyte 21 may have the ionic conductivity greater than the ionic conductivity of the second solid electrolyte 22, for example, by 1.5 fold or greater, by about 2 fold or greater, by about 3 fold or greater, by about 4 fold or greater, by about 5 fold or greater, by about 10 fold or greater, by about 20 fold or greater, by about 30 fold or greater, by about 50 fold or greater, by about 100 fold or greater, by about 150 fold or greater, or by about 200 fold or greater of the ionic conductivity of the second solid electrolyte 22.

The first solid electrolyte 21 and the second solid electrolyte 22 may be mixed so that the surface of the first solid electrolyte 21 may be covered with the second solid electrolyte 22, thus ensuring a main ion transfer path through the first solid electrolyte 21 and minimizing the incidence of pores by filling the space between particles of the first solid electrolyte 21 with the second solid electrolyte 22.

According to various exemplary embodiments of the present invention, energy density may be improved through an increase in the density of the electrode mixture, and lithium dendrite growth may be suppressed. Furthermore, contact between electrolyte particles may be improved, thus facilitating the interfacial ion migration and reducing the deformation of the solid electrolyte layer, and moreover, the internal resistance of the all-solid battery is reduced and high power output thereof becomes possible.

EXAMPLE

A better understanding of the present invention will be given through the following examples, which are merely set forth to illustrate, but are not to be construed as limiting the scope of the present invention.

Example 1

1. Preparation of Heterogeneous Composite Electrolyte Powder

As a first solid electrolyte, an argyrodite-type crystalline sulfide solid electrolyte, Li$_6$PS$_5$Cl, was used. The ionic conductivity of the first solid electrolyte was measured to be $3 \times 10^{-3}$ S/cm through the evaluation of AC impedance of solid electrolyte pellets. As a second solid electrolyte, an amorphous sulfide solid electrolyte, Li$_2$S—P$_2$S$_5$, was used. The ionic conductivity of the second solid electrolyte was measured to be $8 \times 10^{-4}$ S/cm in the same manner as above.

The first solid electrolyte, having an ionic conductivity of $3 \times 10^{-3}$ S/cm, and the second solid electrolyte, having an ionic conductivity of $8 \times 10^{-4}$ S/cm, were placed at a weight ratio of 70:30 in a ball-milling vessel, and were then milled at 250 rpm for 1 hr using a planetary ball mill (P7, Fritch), thus obtaining a heterogeneous composite electrolyte powder.

2. Preparation of Electrode Slurry and Electrolyte Slurry (1) Preparation of Cathode Slurry In order to prepare a cathode composite, a LiCoO$_2$ cathode active material powder, the heterogeneous composite electrolyte powder, Super C65 made by Timcal as a conductive additive powder, and NBR (acrylonitrile-butadiene rubber) as a binder for electrode binding were mixed at a weight ratio of 70:30:5:5.

The mixture thus obtained was mixed with an organic solvent to give a slurry having a viscosity of about 1400 cPs. The organic solvent was xylene.

(2) Preparation of Anode Slurry

A natural graphite anode active material, the heterogeneous composite electrolyte powder, Super C65 made by Timcal as a conductive additive powder, and NBR as a binder for electrode binding were mixed at a weight ratio of 70:30:5:5. The mixing processing was performed under the same conditions as in the cathode slurry mixing.

(3) Preparation of Electrolyte Slurry

The heterogeneous composite electrolyte powder and a binder NBR were mixed at a weight ratio of 95:5. The mixing processing was performed under the same conditions as in the cathode slurry mixing.

3. Manufacture of all-Solid Battery

An all-solid battery was manufactured using the cathode slurry, the electrolyte slurry and the anode slurry. A small pouch-type all-solid battery having an area of 80 mm×60 mm was manufactured through high-pressure pressing at 4 ton/cm$^2$. The all-solid battery included the cathode layer electrode, the electrolyte layer and the anode layer electrode, which were sequentially stacked.

Comparative Example 1

An all-solid battery was manufactured in the same manner as in Example 1, with the exception that each of a cathode slurry, an anode slurry, and an electrolyte slurry was formed using only the first solid electrolyte of Example 1.

Comparative Example 2

An all-solid battery was manufactured in the same manner as in Example 1, with the exception that each of a cathode slurry, an anode slurry, and an electrolyte slurry was formed using only the second solid electrolyte of Example 1.

Test Example 1: Comparison of Microstructures of Cathode Layers

In order to compare the microstructures of the cross-sections of the cathode layers of the all-solid batteries of Example 1 and Comparative Example 1, SEM (scanning electron microscope) measurement was performed. The results are shown in FIGS. 3A and 3B.

Figure 3A:
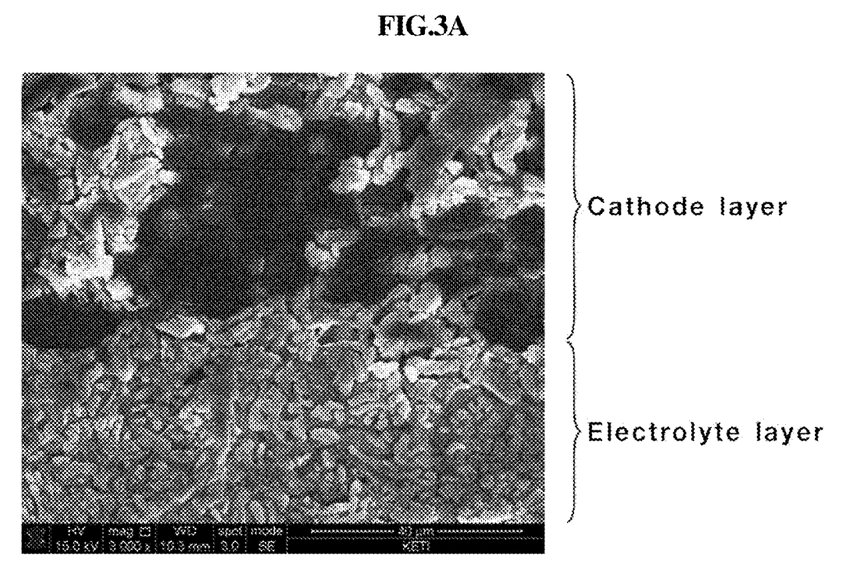
FIG. 3A is a scanning electron microscope (SEM) image showing the cross-section of a cathode layer of the all-solid battery manufactured in Comparative Example 1 of the present invention.
Figure 3B:
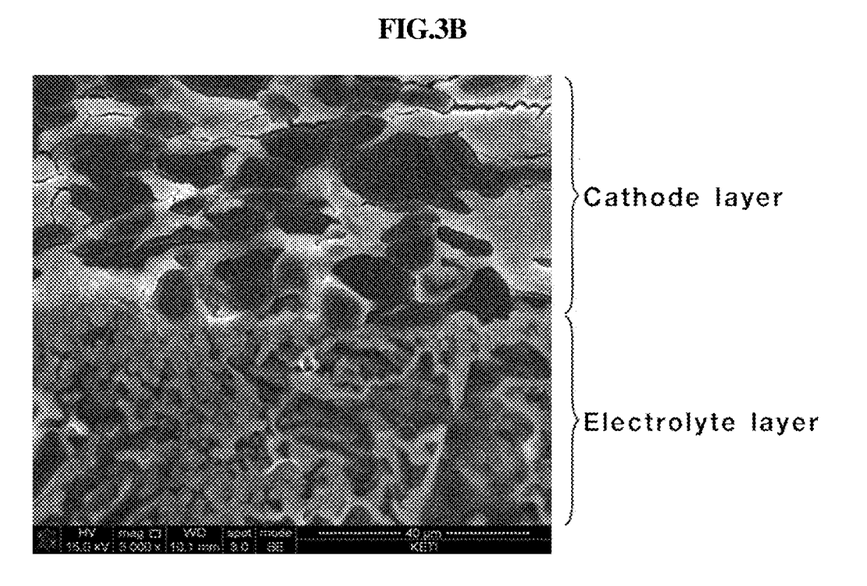
FIG. 3B is an SEM image showing the cross-section of an exemplary cathode layer of an exemplary all-solid battery manufactured in Example 1 according to an exemplary embodiment of the present invention.

FIG. 3A is an SEM image showing the cross-section of the cathode layer of the all-solid battery manufactured in Comparative Example 1. FIG. 3B is an SEM image showing the cross-section of the cathode layer of the all-solid battery manufactured in Example 1. With reference to FIGS. 3A and 3B, the cathode layer of Comparative Example 1 was not dense, and was cracked, in contrast with the cathode layer of Example 1.

Test Example 2: Evaluation of Battery Performance

Figure 4:
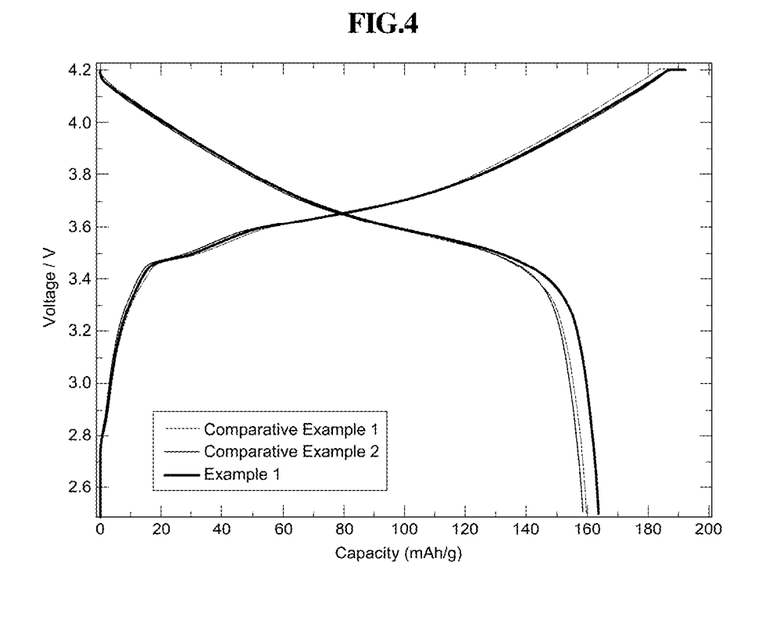
FIG. 4 is a graph showing capacity versus voltage upon charge/discharge of the all-solid batteries of Comparative Examples 1 and 2 and Example 1 of the present invention.
Figure 5:
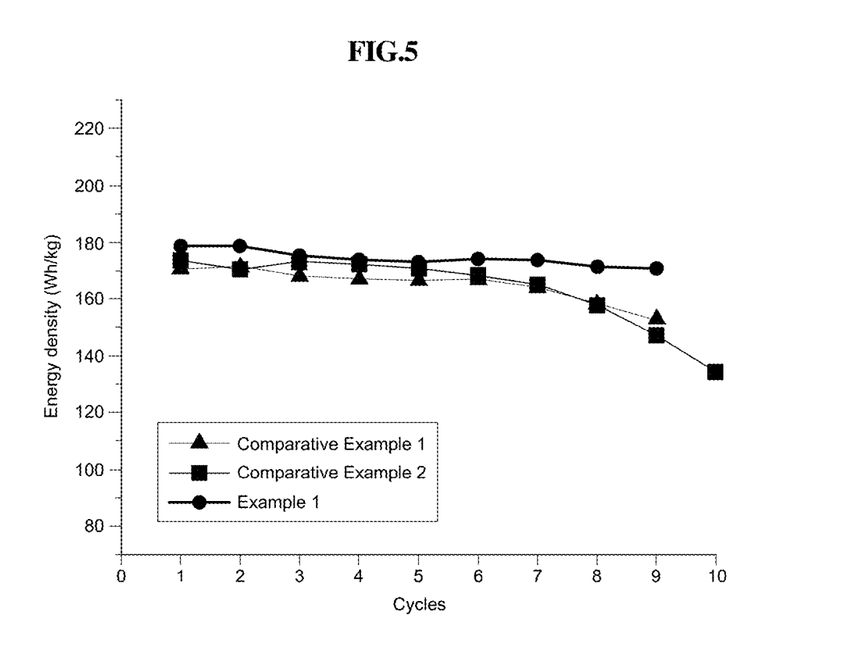
FIG. 5 is a graph showing the results of measurement of energy density depending on the number of charge/discharge cycles of the all-solid batteries of Comparative Examples 1 and 2 and Example 1 of the present invention.

The performance results of the all-solid batteries of Example 1 and Comparative Examples 1 and 2 were evaluated. The results are shown in FIG. 4 and Table 1 below. FIG. 4 is a graph showing capacity versus voltage upon charge/discharge of the all-solid batteries of Example 1 and Comparative Examples 1 and 2.

of the initial capacity was maintained even at 10 cycles. However, in Comparative Examples 1 and 2, as the number of charge/discharge cycles increased, the capacity was drastically decreased compared to the initial capacity.

Although various exemplary embodiments of the present invention have been described with reference to the accompanying drawings, those skilled in the art will appreciate that the present invention may be embodied in other specific forms without changing the technical spirit or essential features. Thus, embodiments described above should be understood to be illustrative in every way and non-limiting.

What is claimed is:

1. An all-solid battery, comprising:
   a cathode;
   an anode; and
   a solid electrolyte layer disposed between the cathode and the anode,
   wherein the solid electrolyte layer comprises a first solid electrolyte having an ionic conductivity ranging from greater than about $5 \times 10^{-3}$ S/cm to about $1 \times 10^{-1}$ S/cm and a second solid electrolyte having an ionic conductivity ranging from greater than about $5 \times 10^{-4}$ S/cm to about $1 \times 10^{-2}$ S/cm.

2. The all-solid battery of claim 1, wherein the first solid electrolyte is at least one crystalline sulfide solid electrolyte selected from the group consisting of Li—Ge—P—S, Li—Si—P—S—Cl, Li—P—S—Cl, Li—P—S—Br and Li—P—S—Br—Cl.

3. The all-solid battery of claim 1, wherein the second solid electrolyte is at least one amorphous sulfide solid electrolyte selected from the group consisting of LiI$Li_2$S—$P_2S_5$, LiI—$Li_2$S—$B_2S_3$, $Li_3PO_4$—$Li_2$S—$Si_2$S, $Li_3PO_4$—$Li_2$S—$SiS_2$, $LiPO_4$—$Li_2$S—SiS, LiI—$Li_2$S—$P_2O_5$, LiI—$Li_3PO_4$—$P_2S_5$, $Li_3PS_4$, and $Li_2$S—$P_2S_5$.

TABLE 1

| No. | Loading per element (mg/cm$^2$) | | | Anode/Cathode (N/P) | Cathode capacity (mAh/g) | Initial efficiency (%) | Average discharge voltage (V) | Energy density (Wh/kg) |
| --- | --- | --- | --- | --- | --- | --- | --- | --- |
| | Cathode | Anode | Electrolyte layer | | | | | |
| Comp. Ex. 1 | 20.5 | 12.4 | 5.8 | 1.16 | 157 | 75 | 3.67 | 169 |
| Comp. Ex. 2 | 22.0 | 15.6 | 3.9 | 1.26 | 160 | 85 | 3.67 | 172 |
| Ex. 1 | 20.5 | 12.7 | 4.8 | 1.19 | 164 | 87 | 3.68 | 179 |

As shown in FIG. 4 and Table 1, when comparing Example 1 with Comparative Examples 1 and 2, initial charge/discharge efficiency and average discharge voltage were improved, and cathode capacity and cell energy density were also improved.

Test Example 3: Evaluation of Durability

The energy density was evaluated depending on the number of charge/discharge cycles of the all-solid batteries of Example 1 and Comparative Examples 1 and 2. The results are shown in FIG. 5.

FIG. 5 is a graph showing the energy density depending on the number of charge/discharge cycles of the all-solid batteries of Example 1 and Comparative Examples 1 and 2. As shown in FIG. 5, even when the number of charge/discharge cycles was increased in Example 1 compared to Comparative Examples 1 and 2, the energy density was maintained at a level similar to the initial capacity. In Example 1 in particular, a high capacity of 96% or greater 4. The all-solid battery of claim 1, wherein a particle size of the second solid electrolyte is less than a particle size of the first solid electrolyte.

5. The all-solid battery of claim 4, wherein the first solid electrolyte has a particle size of about 5 to 20 μm.

6. The all-solid battery of claim 4, wherein the second solid electrolyte has a particle size of about 0.5 to 4 μm.

7. The all-solid battery of claim 1, wherein a weight ratio of the first solid electrolyte to the second solid electrolyte is about 50:50 to 90:10.

8. The all-solid battery of claim 1, wherein the cathode comprises the first solid electrolyte, the second solid electrolyte and a cathode active material.

9. The all-solid battery of claim 8, wherein the cathode active material is at least one selected from the group consisting of lithium cobalt oxide, lithium iron phosphate, nickel cobalt aluminum, and nickel cobalt manganese.

10. The all-solid battery of claim 1, wherein the anode comprises the first solid electrolyte, the second solid electrolyte, and an anode active material.

11. The all-solid battery of claim 10, wherein the anode active material is at least one selected from the group consisting of graphitizable carbon (soft carbon), non-graphitizable carbon (hard carbon), natural graphite, artificial graphite, silicon (Si) and tin (Sn).

12. A vehicle comprising an all-solid battery of claim 1.

* * * * *